United States Patent

Huelke et al.

(10) Patent No.: US 8,820,597 B2
(45) Date of Patent: Sep. 2, 2014

(54) VEHICLE GARMENT HOOK AND GUARD MOUNTING ASSEMBLY

(75) Inventors: David R. Huelke, Milan, MI (US);
Guillermo Alanis, Naucalpan (MX);
Jeff Todd Baxter, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 13/564,448

(22) Filed: Aug. 1, 2012

(65) Prior Publication Data

US 2014/0034692 A1 Feb. 6, 2014

(51) Int. Cl.
*B60R 7/10* (2006.01)

(52) U.S. Cl.
USPC ........ 224/313; 224/311; 224/553; 248/294.1; 248/304; 248/308

(58) Field of Classification Search
CPC ............. B60R 7/10; B60R 7/08; B60N 3/023
USPC ......... 224/311, 313, 553, 544, 556, 557, 567, 224/570, 281, 282; 16/438, 444, 445; 248/291.1, 294.1, 304, 308
See application file for complete search history.

(56) References Cited

U.S. PATENT DOCUMENTS

| | | | | | |
|---|---|---|---|---|---|
| 2,390,257 | A | * | 12/1945 | Jahn | 248/294.1 |
| 3,385,547 | A | * | 5/1968 | West | 248/308 |
| 4,221,354 | A | * | 9/1980 | Kempkers | 248/291.1 |
| 4,720,028 | A | * | 1/1988 | Takemura et al. | 224/553 |
| 4,787,590 | A | * | 11/1988 | Melvin | 248/291.1 |
| 5,507,423 | A | * | 4/1996 | Fischer et al. | 224/313 |
| 5,769,294 | A | * | 6/1998 | Heinz et al. | 224/567 |
| 6,076,233 | A | * | 6/2000 | Sasaki et al. | 16/444 |
| 6,095,469 | A | * | 8/2000 | Von Alman | 248/304 |
| 6,397,435 | B1 | * | 6/2002 | Gosselet | 16/438 |
| 6,643,897 | B2 | * | 11/2003 | Chang | 16/248 |
| 6,663,067 | B2 | | 12/2003 | Gordon | |
| 6,908,269 | B1 | * | 6/2005 | Youngs et al. | 410/100 |
| 6,968,601 | B2 | * | 11/2005 | Bivens et al. | 24/369 |
| 7,103,939 | B2 | * | 9/2006 | Belchine et al. | 16/412 |
| 7,669,821 | B2 | * | 3/2010 | Martin | 248/294.1 |
| 7,988,115 | B2 | * | 8/2011 | Lee et al. | 248/304 |
| 8,079,446 | B2 | * | 12/2011 | Nemoto | 185/40 H |
| 8,240,625 | B2 | * | 8/2012 | Kato | 248/304 |
| 8,272,548 | B2 | * | 9/2012 | Le Texier et al. | 224/570 |
| 8,550,417 | B2 | * | 10/2013 | Lee et al. | 248/304 |
| 8,677,569 | B2 | * | 3/2014 | Ruzich et al. | 16/445 |
| 8,733,830 | B2 | * | 5/2014 | Sanchez | 297/188.03 |
| 2005/0076471 | A1 | * | 4/2005 | Watanabe et al. | 16/66 |
| 2007/0228702 | A1 | * | 10/2007 | Ono et al. | 280/730.2 |

OTHER PUBLICATIONS

Duluth Trading Co, "P38 Dog Guard Installation or Removal," Feb. 1, 2012 (2 pages).

* cited by examiner

*Primary Examiner* — Brian D Nash
*Assistant Examiner* — Corey Skurdal
(74) *Attorney, Agent, or Firm* — Vichit Chea; Price Heneveld LLP

(57) ABSTRACT

A garment hook assembly for use in a vehicle includes a housing, a cover slidingly coupled to the housing and having an aperture therethrough, and a garment hook pivotally mounted to the housing. The housing is mounted to a trim component having a complementary aperture therethrough such that pivoting the garment hook away from the housing exposes a passageway through the cover and trim component apertures for access to an underlying vehicle body structure.

19 Claims, 5 Drawing Sheets

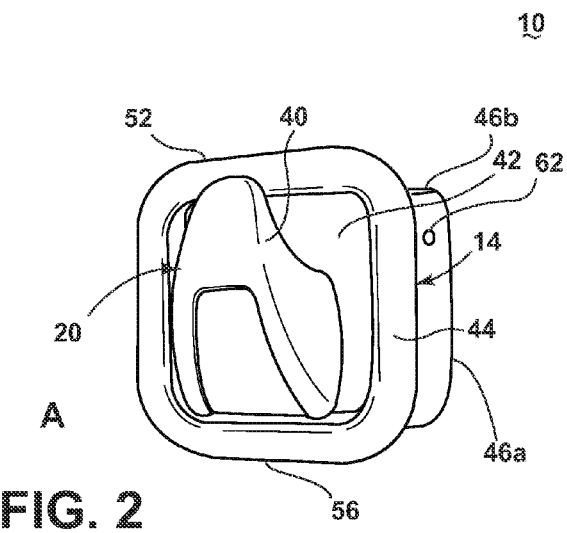
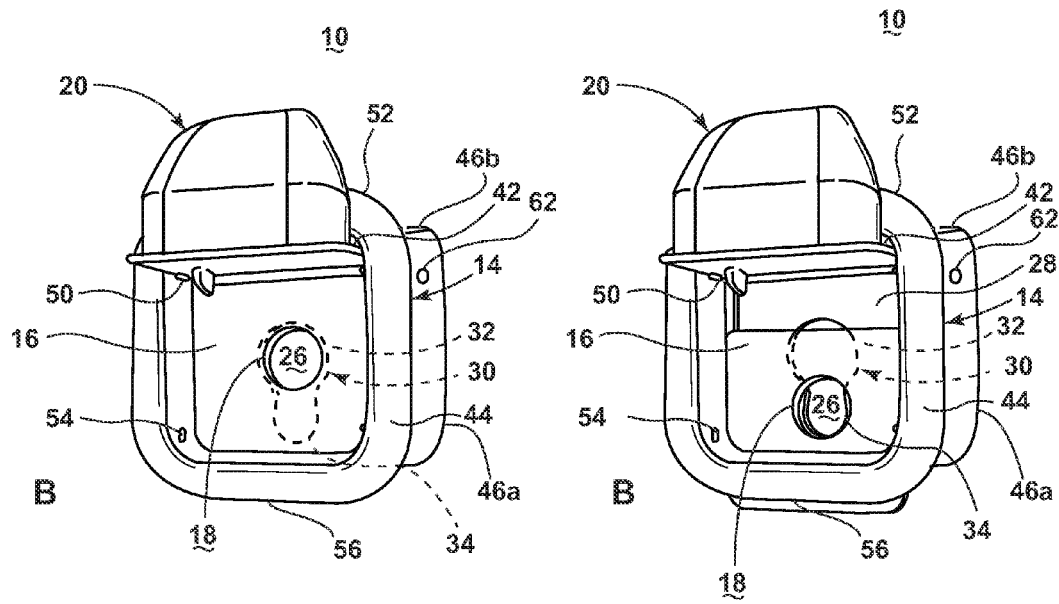

VEHICLE GARMENT HOOK AND GUARD MOUNTING ASSEMBLY

FIELD OF THE INVENTION

The present invention generally relates to a garment hook for a vehicle interior, and more particularly to a combination pivotable garment hook and guard mounting assembly.

BACKGROUND OF THE INVENTION

The interior of an automotive vehicle typically includes a coat hook mounted along the edge of the roof structure. Clothing, clothes hangers, and the like can be hung from the coat hook to permit the hanging of articles while traveling. The coat hook may be stationary, retractable, or may be recessed into the headliner.

Additionally, often pet owners need to transport pets, such as dogs, in their vehicle. Devices may be used which separate the driver's compartment from the cargo area to keep pets from interfering with the driver while driving. These devices can be formed of metal or aluminum, netting, straps, and can be affixed to the vehicle interior in a variety of ways.

SUMMARY OF THE INVENTION

One aspect of the present invention includes a garment hook assembly for use in a vehicle. The garment hook assembly includes a housing, a cover slidingly coupled to the housing and having an aperture therethrough, and a garment hook pivotally mounted to the housing. The housing is mounted to a trim component having a complementary aperture therethrough such that pivoting the garment hook away from the housing exposes a passageway through the cover and trim component apertures for access to an underlying vehicle body structure.

Another aspect of the present invention includes a garment hook assembly for use on a headliner in a vehicle. The garment hook assembly includes a housing, a cover slidingly coupled to the housing and having an aperture therethrough, and a garment hook pivotally mounted to the housing. The housing is mounted to a headliner having a complementary aperture therethrough such that pivoting the garment hook away from the housing exposes a passageway through the cover and headliner apertures for access to an underlying vehicle roof structure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a side perspective view of the garment hook and guard mount assembly of FIG. 1 in a lowered position;

FIG. 3 is a side perspective view of the garment hook and guard mount assembly of FIG. 1 and an underlying vehicle body structure, illustrating an open position;

FIG. 4 is a side perspective view of the garment hook and guard mount assembly of FIG. 1 and the underlying vehicle body structure, illustrating an open position with a cover slid down;

DETAILED DESCRIPTION OF THE PREFERRED EMBODIMENTS

Figure 1:
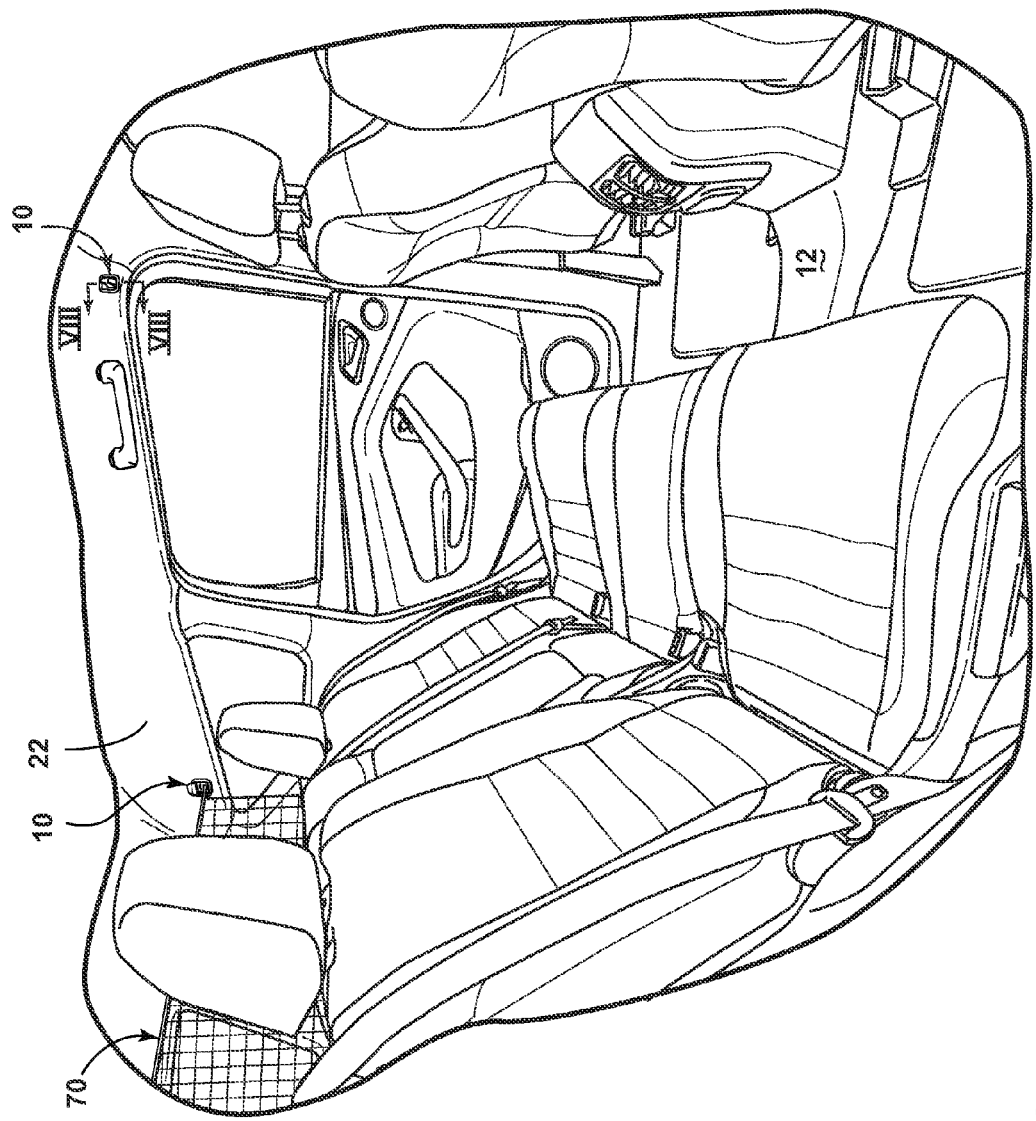
FIG. 1 is a top perspective view of a garment hook and guard mount assembly disposed inside a vehicle.
Figure 5:
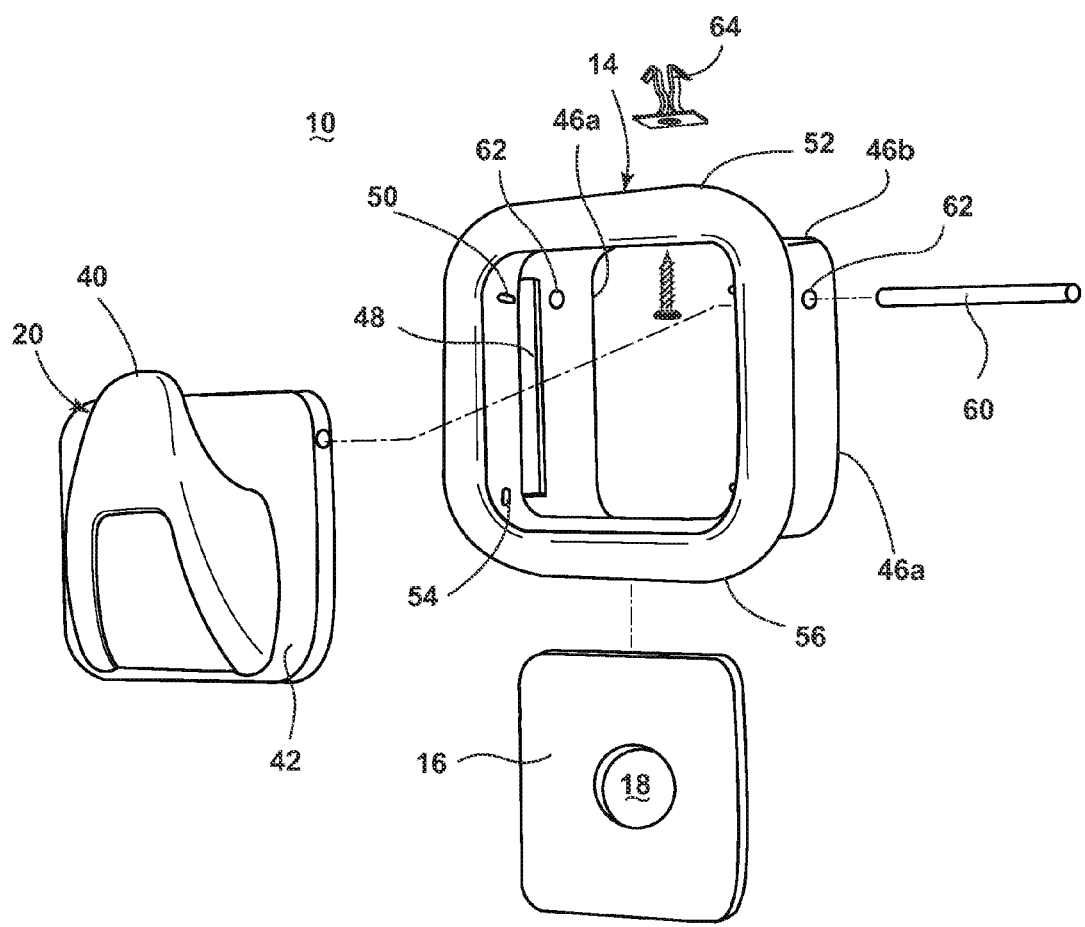
FIG. 5 is an exploded side perspective view of the garment hook and guard mount assembly of FIG. 1.

For purposes of description herein, the terms "upper," "lower," "right," "left," "rear," "front," "vertical," "horizontal," "interior," "exterior," and derivatives thereof shall relate to the garment hook and guard mount assembly as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, reference numeral 10 generally designates a garment hook and guard mount assembly, referred to herein as "mount assembly", for use in an automotive vehicle interior 12. The mount assembly 10 includes a housing 14, a cover 16 that is slidingly coupled to the housing 14 and has an aperture 18 therethrough, and a garment hook 20 pivotally mounted to the housing 14. The housing 14 is mounted to a trim component 22 having a complementary aperture 24 therethrough such that pivoting the garment hook 20 away from the housing 14 exposes a passageway 26 through the cover and trim component apertures 18, 24 for access to an underlying vehicle body structure 28.

In the illustrated embodiment, the trim component 22 is shown in the form of a headliner; however, other trim components, including pillar trim, interior panels, and the like are contemplated according to other embodiments. Further, the underlying vehicle body structure 28 is shown in form of a roof structure; however, other body structures, including pillars, body panels, and the like are contemplated according to other embodiments.

The headliner 22 may be a formed and molded headliner for mounting to the interior of the roof structure 28 of the vehicle, so as to provide an aesthetically pleasing appearance for the interior 12 thereof. The headliner 22 is shaped to conform to the roof structure 28 and may include a plurality of contours and apertures for mounting various overhead components, such as sun visors, overhead consoles, grab handles, lights, and the like. The roof structure 28 includes a pair of spaced side rails, and at least front and rear headers, and may also include additional roof bows, as is conventional.

Referring now to FIGS. 2-5, the garment hook 20 includes a hook portion 40 and a plate portion 42. The hook portion 40 terminates in a tip, and the plate portion 42 is disposed at a base of the hook portion 40. The hook portion 40 and the plate portion 42 are substantially perpendicular to one another.

The housing 14 includes a bezel 44 and sidewalls 46. In the illustrated embodiment, the housing 14 is shown having a rectangular shape with pairs of opposed sidewalls 46; however, other housing shapes, and sidewall configurations, are also contemplated according to other embodiments. Sidewalls 46a are disposed along the long sides of the housing 14, and sidewalls 46b are disposed along the short sides of the housing 14. Each sidewall 46a has a track 48 that protrudes a small distance into the center of the housing 14. Additionally, a stop member 50 is disposed on an interior face of at least one of the sidewalls 46a, and is positioned near a top portion 52 of the housing 14. A second stop member 54 is disposed on the interior face of at least one of the sidewall 46a, and is positioned near a lower portion 56 of the housing 14. Further, an elongated opening 58 (FIG. 7) is disposed through the short sidewall 46b located on the lower portion 56 of the housing 14.

Figure 7:
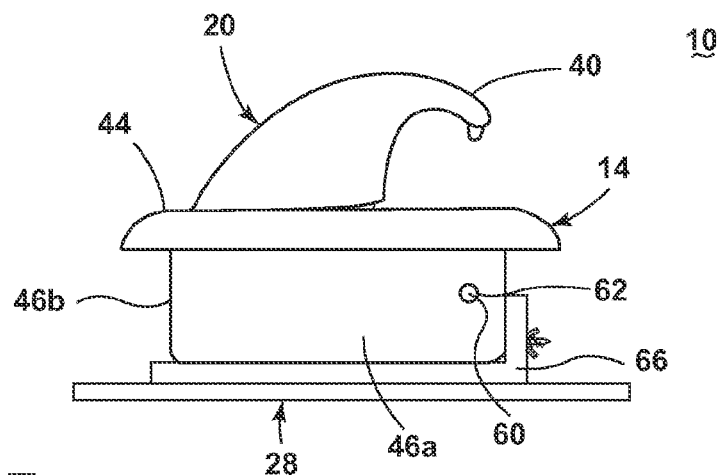
FIG. 7 is a side view of the garment hook and guard mount assembly of FIG. 1, the underlying vehicle body structure, and the bracket.
Figure 8:
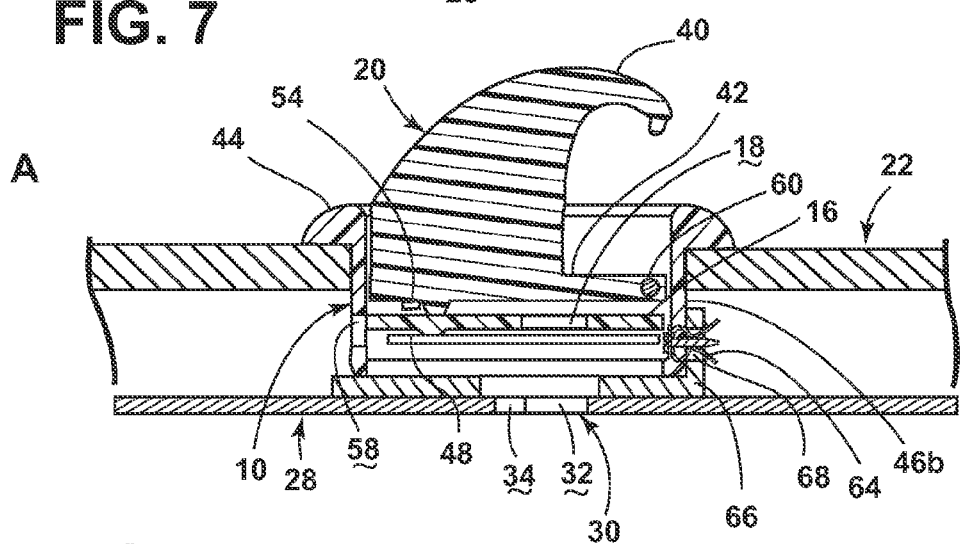
FIG. 8 is a cross-sectional side view taken along line VIII-VIII of FIG. 1, illustrating the assembly in a lowered position.
Figure 9:
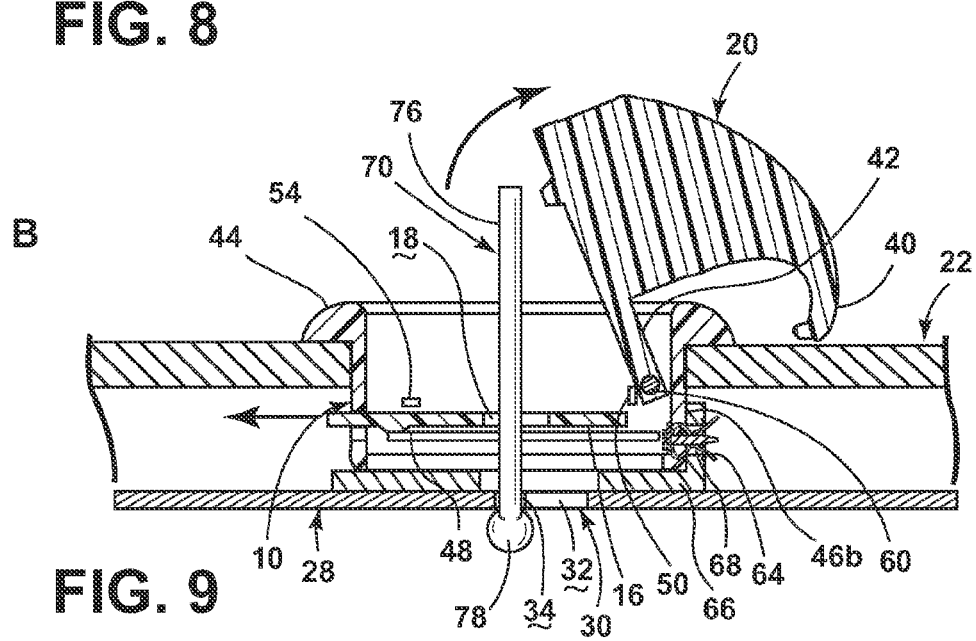
FIG. 9 is a cross-sectional side view taken along line VIII-VIII of FIG. 1, illustrating the assembly in an open position, with the guard mounted thereto.

Referring now to FIGS. 7-9, the housing 14 also includes a fastener 64 mounted on an exterior face of the short sidewall 46b, at the top portion 52 of the housing 14. The fastener 64 can be coupled to the short sidewall 46b by a threaded fastener, or any other suitable attachment means. Further, a complementary aperture 68 is located in a bracket 66 that is affixed to the roof structure 28. When installed, the fastener 64 is retained within the aperture 68. The bracket 66 can be welded, or coupled by any suitable means, to the roof structure 28, and is disposed between the headliner 22 and the roof structure 28. The fastener 64 and bracket 66 are configured to couple the housing 14 and mount assembly 10 to the roof structure 28 when installed in the vehicle. Additionally, fastener 64 and bracket 66 provide support to the mount assembly 10 when a load is applied to the garment hook 20. Alternatively, the fastener 64 can be retained by an aperture in the roof structure 28.

Referring back to FIGS. 2-5, the cover 16 is a substantially flat, rectangular member and is substantially the same shape as the housing 14 perimeter. The aperture 18 extends through the cover 16 and is positioned at the center of the cover 16, though it could be positioned nearly anywhere on the cover 16.

The garment hook 20 and cover 16 are each independently mounted to the housing 14. Specifically, the garment hook 20 is pivotally mounted to the housing 14 by a pivot pin 60. The pivot pin 60 is disposed near the top portion 52 of the plate portion 42 of the garment hook 20. The pivot pin 60 may be affixed to the plate portion 42 by any suitable means, including insert molding, friction fit, and adhesive. The ends of the pivot pin 60 are received in coordinating holes 62 through the long sidewalls 46a of the housing 14. The cover 16 is inserted into the elongated opening 58 (FIG. 7) in the short sidewall 46b of the housing 14. The sides of the cover 16 are supported by the tracks 48 that extend along a substantial length of the long sidewalls 46a. The cover 16 is configured to be able to slide along the tracks 48 within the housing 14.

The garment hook 20 may be pivoted about the pivot pin 60 from the initial, lowered position A, shown in FIG. 2, to an open position B, shown in FIGS. 3 and 4. In the lowered position A, the garment hook 20 is prevented from pivoting too far into the housing 14 by the pair of second stop members 54 located on the inner face of the sidewalls 46a. The second stop members 54 protrude out from the sidewalls 46a, creating a stop to limit the rotation of the plate portion 42 and garment hook 20. Additionally, when a load is applied to the hook portion 40, for example, a clothes hanger holding an article of clothing, the second stop members 54 prevent the garment hook 20 from over rotating.

When the garment hook 20 is pivoted away from the housing 14 to the open position B, it is maintained in the open position B by the pair of stop members 50 which are located on the inner face of the sidewalls 46a. Similar to the second stop members 54, the stop members 50 protrude out from the sidewalls 46a. However, the stop members 50 are configured such that a measure of force must be used to pivot the plate portion 42 of the garment hook 20 beyond the stop members 50. Once the plate portion 42 has passed by the stop members 50, the stop members 50 retain the garment hook 20 in the open position B. Oppositely, a measure of force must be used to again overcome the stop member 50 to pivot the garment hook 20 back to the lowered position A.

Figure 6:
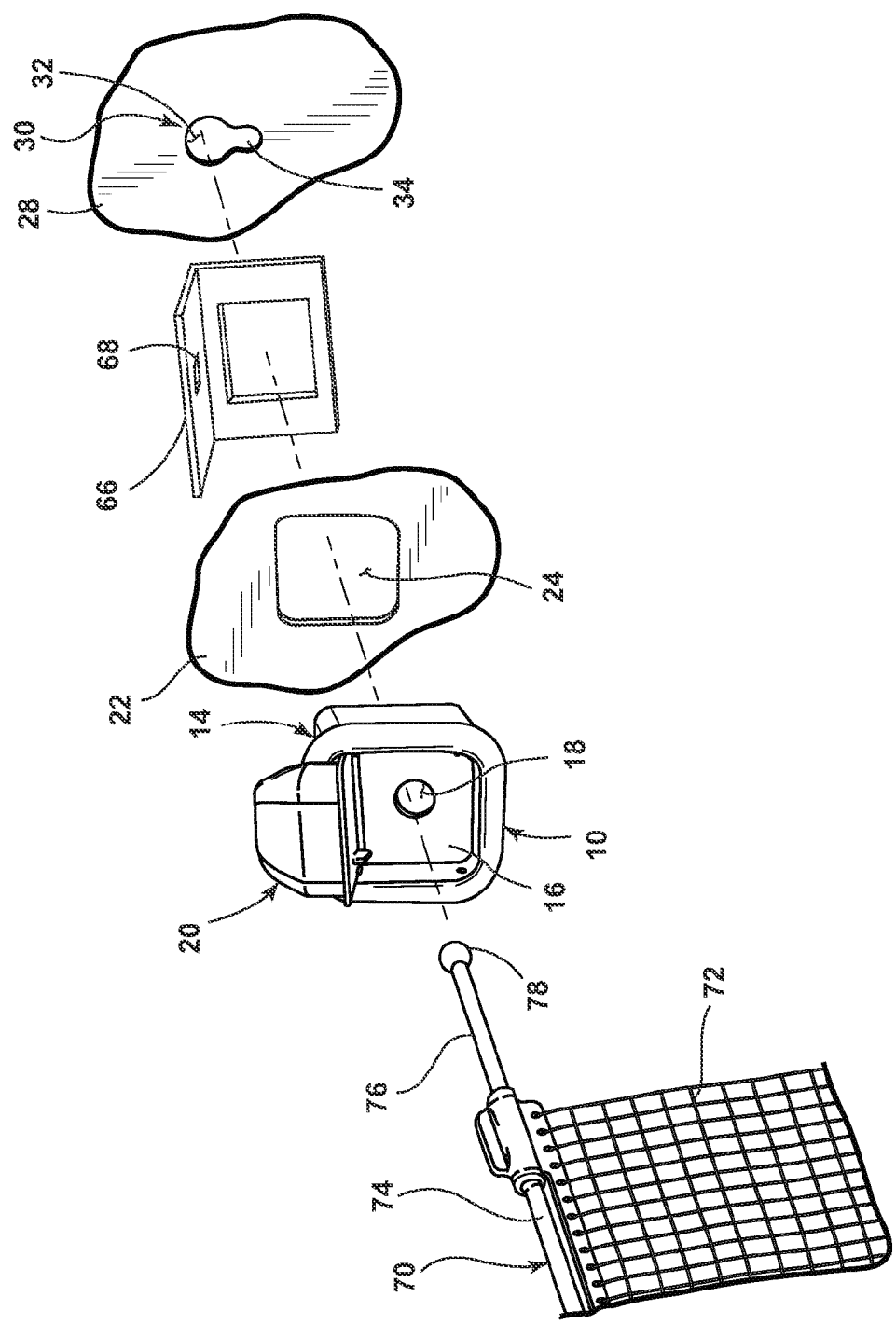
FIG. 6 is a partially exploded view of the garment hook and guard mount assembly, showing a trim component, underlying vehicle body structure, a bracket, and a guard for mounting thereto.

Referring now to FIG. 6, according to one embodiment, the mount assembly 10 may be used to provide access from the interior 12 of the vehicle to the underlying vehicle body structure 28. In the illustrated embodiment, the underlying vehicle body structure 28 is shown in the form of the roof structure, and may be a side rail. Additionally, the roof structure 28 includes a keyhole slot 30 extending therethrough; the keyhole slot 30 having a hole 32 and a tapered slot 34.

A guard 70 may be selectively used in conjunction with the mount assembly 10. The guard 70 can be removably coupled to the mount assembly 10 to partition the passenger space from the remaining rearward interior 12 of the vehicle. The guard 70 and mount assembly 10 may be disposed behind the driver/front passenger seats, behind the backseat passenger seats, or may be disposed at both locations. The guard 70 can be used to confine dogs or other animals to the areas behind the front seats or back seats, depending upon the location to which the guard 70 is installed.

In the illustrated embodiment, the guard 70 is shown having a net 72; however, other structures that provide a barrier, such as a screen, straps, tubular fencing, and the like are contemplated according to other embodiments. The guard 70 further includes a support rod 74 that has a fitting 76 at each end thereof, the fitting 76 terminating in a bulbous head 78. The net 72 is mounted on the support rod 74, spanning substantially the width of the vehicle. When installed, the fitting 76 passes through the passageway 26. Stated differently, the fitting 76 is disposed in the aperture 18 in the cover 16 and the aperture 24 in the headliner 22. Further, the fitting 76 is retained in the keyhole slot 30 located in the roof structure 28.

Referring to FIGS. 7-9, when desired to utilize the guard 70, it may be installed into the mount assembly 10 according to the following method. To begin, the garment hook 20 is pivoted up, about pivot pin 60, to the open position B (FIG. 9), thereby exposing the cover 16 and passageway 26 (FIG. 3). Further, stop members 50 retain the garment hook 20 in the open position B, as previously described. Next, the support rod 74 of the guard 70 is moved into alignment; inserting the fitting 76 into the passageway 26 such that the head 78 passes through the hole 32 of the keyhole slot 30. To lock the guard 70 into position, the user moves the fitting 76 into the slot 34 of the keyhole slot 30. This motion causes the cover 16 to slide within the housing 14 and the enlarged head 78 to engage the slot 34, releasably locking the support rod 74 to the roof structure 28. The guard 70 may be removed in an opposite fashion.

It should easily be understood by one having ordinary skill in the art that the shape of the keyhole slot 30 could be different according to another embodiment. Other locking slot configurations, known to those skilled in the art, are also feasible. Additionally, it is also contemplated, according to another embodiment, that the fitting 76 and enlarged head 78 could be positioned on the roof structure 28, and the keyhole slot 30 could be provided on the end of the support rod 74.

The garment hook and guard mount assembly 10 described herein enables multiple functionalities for a single trim component. In the case that the vehicle owner does not have a pet, or does not need or care to use the guard 70, the mount assembly 10 may be utilized for the garment hook 20, to hang articles of clothing or such. Alternatively, for the owner who does have a pet and wants to use the guard 70, the mount assembly 10 can selectively be used as desired: a garment hook 20 or an attachment means for the guard 70, whichever the user currently desires. The mount assembly 10 and installed guard 70 prevent the contained pet from climbing, leaping, or otherwise moving forward from the rear luggage or cargo portion of the vehicle and into the seating portions of the vehicle, which may be occupied by a driver or passengers.

It will be understood by one having ordinary skill in the art that construction of the described attachment system and other components is not limited to any specific material. Other exemplary embodiments of the invention disclosed herein may be formed from a wide variety of materials, unless described otherwise herein.

It is also important to note that the construction and arrangement of the elements of the garment hook and guard mount assembly as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A garment hook assembly for use in a vehicle, comprising:
    a housing;
    a cover slidingly coupled to the housing and having an aperture therethrough; and
    a garment hook pivotally mounted to the housing;
    wherein the housing is mounted to a trim component having a complementary aperture therethrough such that pivoting the garment hook away from the housing exposes a passageway through the cover and trim component apertures for access to an underlying vehicle body structure.

2. The garment hook assembly of claim 1, wherein pivoting the garment hook away from the housing defines an open position.

3. The garment hook assembly of claim 2, wherein the garment hook comprises a hook and a plate.

4. The garment hook assembly of claim 3, wherein the plate is pivotally mounted to the housing by a pivot pin.

5. The garment hook assembly of claim 2, wherein the housing comprises a bezel and sidewalls.

6. The garment hook assembly of claim 5, wherein at least one of the housing sidewalls includes a stop member for retaining a plate of the garment hook in the open position.

7. The garment hook assembly of claim 2, wherein the underlying vehicle body structure comprises a keyhole slot.

8. The garment hook assembly of claim 7, wherein a guard is removably mounted to the keyhole slot in the vehicle body structure, the guard having a support rod terminating at an end thereof in a fitting.

9. The garment hook assembly of claim 8, wherein the fitting is disposed in the passageway through the cover and trim component apertures and is retained in the keyhole slot when the garment hook is in the open position.

10. The garment hook assembly of claim 9, wherein the guard comprises a net.

11. A garment hook assembly for use in a vehicle, comprising:
    a housing;
    a cover slidingly coupled to the housing and having an aperture therethrough; and
    a garment hook pivotally mounted to the housing;
    wherein the housing is mounted to a headliner having a complementary aperture therethrough such that pivoting the garment hook away from the housing exposes a passageway through the cover and headliner apertures for access to an underlying vehicle roof structure.

12. The garment hook assembly of claim 11, wherein pivoting the garment hook away from the housing defines an open position.

13. The garment hook assembly of claim 12, wherein the garment hook comprises a hook and a plate that is pivotally mounted to the housing by a pivot pin.

14. The garment hook assembly of claim 12, wherein the housing comprises a bezel and sidewalls, at least one of which includes a stop member for retaining a plate of the garment hook in the open position.

15. The garment hook assembly of claim 12, wherein the underlying vehicle roof structure comprises a keyhole slot.

16. The garment hook assembly of claim 15, wherein a guard is removably mounted to the keyhole slot in the vehicle roof structure, the guard having a support rod terminating at an end thereof in a fitting.

17. The garment hook assembly of claim 16, wherein the fitting is disposed in the passageway through the cover aperture and the headliner aperture and is retained in the keyhole slot when the garment hook is in the open position.

18. The garment hook assembly of claim 17, wherein the guard comprises a net.

19. The garment hook assembly of claim 18, wherein the housing includes a fastener for mounting the garment hook assembly to an aperture in the vehicle roof structure.

* * * * *